US008547983B2

(12) United States Patent
Diab et al.

(10) Patent No.: US 8,547,983 B2
(45) Date of Patent: *Oct. 1, 2013

(54) METHOD AND SYSTEM FOR UTILIZING A BROADBAND GATEWAY TO PROVIDE ENERGY EFFICIENT MANAGEMENT IN A HOME NETWORK

(75) Inventors: Wael Diab, San Francisco, CA (US); Jeyhan Karaoguz, Irvine, CA (US); Xuemin Chen, San Diego, CA (US); David Garrett, Tustin, CA (US); David Lundgren, Mill Valley, CA (US); Rich Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/982,321

(22) Filed: Dec. 30, 2010

(65) Prior Publication Data
US 2011/0299412 A1 Dec. 8, 2011

Related U.S. Application Data (60) Provisional application No. 61/351,696, filed on Jun. 4, 2010.

(51) Int. Cl.
*H04L 12/28* (2006.01)
(52) U.S. Cl.
USPC ............................ 370/401; 370/254; 370/311
(58) Field of Classification Search
None
See application file for complete search history.

(56) References Cited

U.S. PATENT DOCUMENTS

2006/0023675 A1* 2/2006 Karaoguz et al. ............ 370/338
2010/0082174 A1* 4/2010 Weaver ......................... 700/295
2011/0299549 A1* 12/2011 Diab et al. .................... 370/401

FOREIGN PATENT DOCUMENTS

WO 2010039239 A2 4/2010

OTHER PUBLICATIONS

Tompros, et al.; "Enabling Applicability of Energy Saving Applications on the Appliances of the Home Environment", IEEE Network, IEEE Service Center, New York, vol. 23, No. 6, p. 8-16, Nov. 1, 2009.
Barros, et al.; "Aim architecture evaluation and validation tesbed", Ultra Modern Telecommunication & Workshops, International Conference on, IEEE, USA, p. 1-5, Oct. 12, 2009.
Berl, et al.; "Virtualization in energy-efficient future home environments", IEEE Communications Magazine, IEEE Service Center, Piscataway, US, vol. 47, No. 12, p. 62-67, Dec. 1, 2009.
European search report for the copending European application 11004117.5, mailed Apr. 11, 2012.

* cited by examiner

*Primary Examiner* — Andrew Chriss
*Assistant Examiner* — Salvador E Rivas
(74) *Attorney, Agent, or Firm* — Thomas Horstemeyer, LLP (57) ABSTRACT

A broadband gateway may provide energy management service within a home network. The energy management service may enable reducing and/or enhancing energy consumption within the home network. The energy management service may comprise managing one or more devices in the home network by the broadband gateway. The energy management service may be performed based on energy-related information associated with devices, and the information may be stored by the broadband gateway. At least some of the energy-related information may be acquired from the managed devices. The energy management service may comprise controlling and/or configuring the managed devices, and/or communications between the managed devices within the home network. The broadband gateway may track actual energy usage by the managed devices. Information corresponding to energy-related activities and/or usage may be displayed via a user interface. The information may also be reported to entities external to the home network.

21 Claims, 7 Drawing Sheets

METHOD AND SYSTEM FOR UTILIZING A BROADBAND GATEWAY TO PROVIDE ENERGY EFFICIENT MANAGEMENT IN A HOME NETWORK

CROSS-REFERENCE TO RELATED APPLICATIONS/INCORPORATION BY REFERENCE

This patent application makes reference to, claims priority to and claims benefit from U.S. Provisional Application Ser. No. 61/351,696 filed on Jun. 4, 2010. This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,355 filed on even date herewith;
U.S. patent application Ser. No. 12/981,971 filed on even date herewith;
U.S. patent application Ser. No. 12/981,933 filed on even date herewith;
U.S. patent application Ser. No. 12/982,216 filed on even date herewith;
U.S. patent application Ser. No. 12/982,433 filed on even date herewith;
U.S. patent application Ser. No. 12/982,205 filed on even date herewith;
U.S. patent application Ser. No. 12/982,353 filed on even date herewith;
U.S. patent application Ser. No. 12/981,966 filed on even date herewith;
U.S. patent application Ser. No. 12/982,453 filed on even date herewith;
U.S. patent application Ser. No. 12/982,172 filed on even date herewith;
U.S. patent application Ser. No. 12/982,429 filed on even date herewith;
U.S. patent application Ser. No. 12/981,990 filed on even date herewith;
U.S. patent application Ser. No. 12/982,442 filed on even date herewith;
U.S. patent application Ser. No. 12/982,000 filed on even date herewith;
U.S. patent application Ser. No. 12/982,010 filed on even date herewith;
U.S. patent application Ser. No. 12/982,022 filed on even date herewith;
U.S. patent application Ser. No. 12/981,986 filed on even date herewith;
U.S. patent application Ser. No. 12/982,236 filed on even date herewith;
U.S. patent application Ser. No. 12/982,091 filed on even date herewith;
U.S. patent application Ser. No. 12/982,213 filed on even date herewith;
U.S. patent application Ser. No. 12/982,166 filed on even date herewith;
U.S. patent application Ser. No. 12/982,340 filed on even date herewith;
U.S. patent application Ser. No. 12/982,073 filed on even date herewith;
U.S. patent application Ser. No. 12/982,501 filed on even date herewith;
U.S. patent application Ser. No. 12/982,206 filed on even date herewith;
U.S. patent application Ser. No. 12/982,440 filed on even date herewith;
U.S. patent application Ser. No. 12/982,171 filed on even date herewith;
U.S. patent application Ser. No. 12/982,223 filed on even date herewith;
U.S. patent application Ser. No. 12/982,305 filed on even date herewith;
U.S. patent application Ser. No. 12/982,477 filed on even date herewith;
U.S. patent application Ser. No. 12/982,331 filed on even date herewith;
U.S. patent application Ser. No. 12/982,036 filed on even date herewith;
U.S. patent application Ser. No. 12/982,196 filed on even date herewith;
U.S. patent application Ser. No. 12/982,391 filed on even date herewith;
U.S. patent application Ser. No. 12/982,405 filed on even date herewith;
U.S. patent application Ser. No. 12/981,753 filed on even date herewith;
U.S. patent application Ser. No. 12/982,414 filed on even date herewith.
U.S. patent application Ser. No. 12/981,733 filed on even date herewith.
Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for utilizing a broadband gateway to provide energy efficient management in a home network.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to encrypt broadcast signals communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a broadband gateway to provide energy efficient management in a home network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a broadband gateway to provide energy efficient management in a home network. In various embodiments of the invention, a broadband gateway, which may communicatively coupled to a plurality of devices in a home network, and/or which may be operable to handle at least one physical layer connection to at least one corresponding network access service provider, may be utilized to provide energy management service within the home network. The energy management service may comprise managing one or more of the plurality of devices in the home network. In this regard, the broadband gateway may maintain energy-related information associated with the serviced devices, and may manage the serviced devices, based on the maintained energy-related data for example. At least some of the energy-related information may be acquired, from at least some of the serviced devices for example. The energy-related information may comprise energy requirements, energy limitations, and/or energy related usage data. The energy management service may comprise controlling and/or configuring the serviced devices, and/or their operations. The energy management service may enable adjusting and/or controlling energy consumption within the home network, such that energy consumption may be reduced and/or optimized. The energy management service may also comprise controlling and/or configuring inter-device communications and/or links within the home network. The broadband gateway may track actual energy use by each of the one or more serviced devices, and the broadband gateway may update and/or modify the stored energy-related information based on that tracking.

The stored energy-related information may comprise device profiles corresponding to each of the one or more serviced devices. The device profile comprising a plurality of settings for controlling and/or managing energy use in an associated device. The device profiles may be configurable, wherein the profile configuration may comprise initializing and/or modifying one or more of a plurality of settings for controlling and/or managing energy use in an associated device. The broadband gateway may display activity associated with the energy management service via a user interface. This may comprise displaying energy related activities and/or data associated with each of the managed devices. A dedicated energy-related messaging protocol may be used for exchanging energy-related messages and/or data within the home network.

Figure 1A:
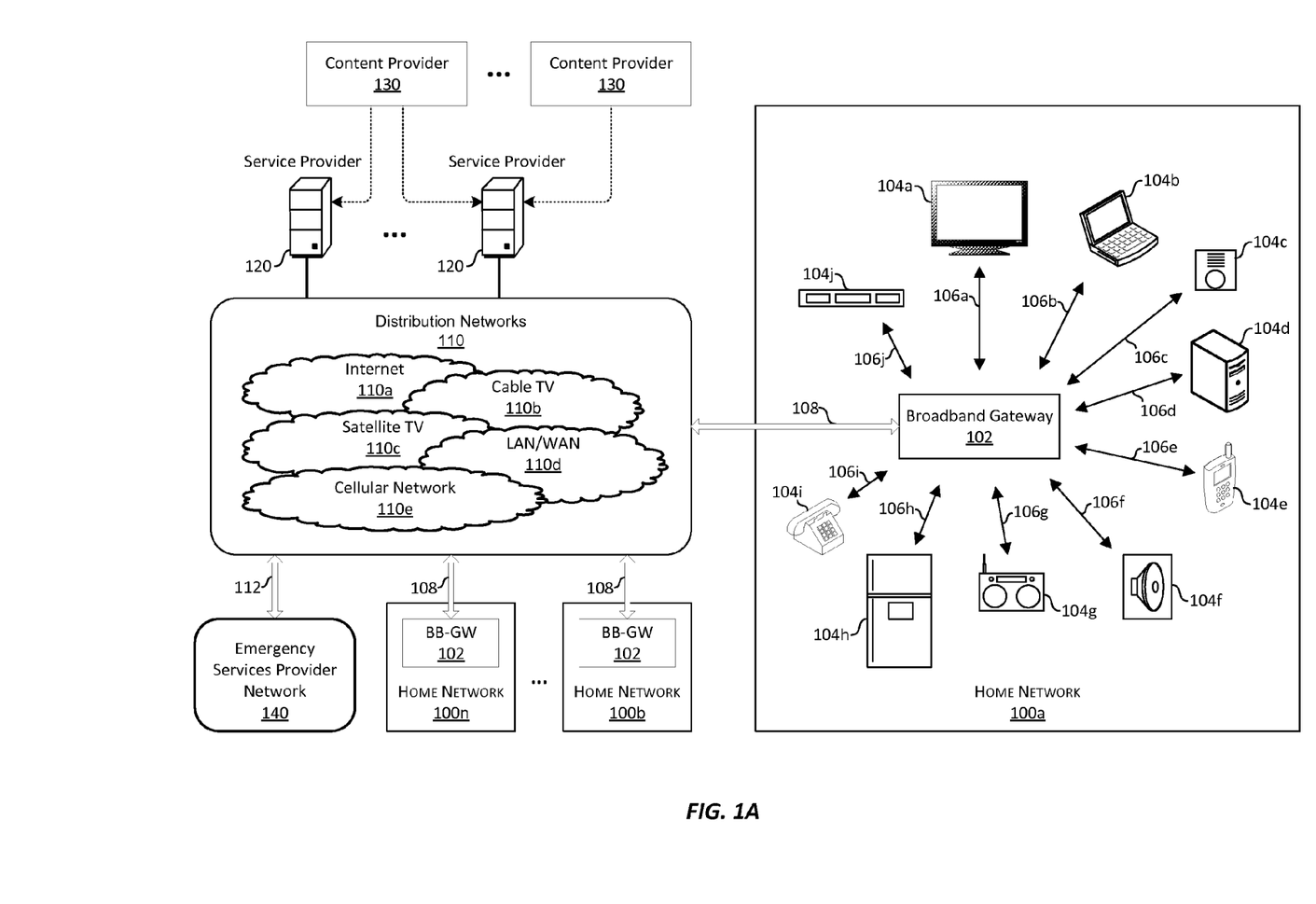
FIG. 1A is a block diagram illustrating an exemplary communication system that comprises a home network serviced by a broadband gateway, in accordance with an embodiment of the invention.

FIG. 1A is a block diagram illustrating an exemplary communication system that comprises a home network serviced by a broadband gateway, in accordance with an embodiment of the invention. Referring to FIG. 1A, there is shown a home network 100a, a plurality of distribution networks 110, a plurality of service providers 120, and a plurality of content providers 130. The home network 100a may be serviced by a broadband gateway 102. Also shown in FIG. 1A are additional home networks 100b, . . . , 100n, and an emergency services provider network 140. Each of the home networks 100b, . . . , 100n may also be serviced by a broadband gateway 102.

The service providers 120 may comprise various entities which may provide, using different access technologies, various services to broadband gateways 102 and/or to devices serviced by the broadband gateways 102, such as the plurality of home devices 104a-104j. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the broadband gateway 102. Such physical layer connections may then be utilized to access content provided by the content providers 130, access services provided by other ones of the service providers 120, and/or access an intranet or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary embodiment of the invention, the broadband gateway 102 may enable connecting to multiple service providers 120 to facilitate receiving content originating from one or more of the content providers 130.

The content providers 130 may comprise various entities and/or networks which may generate, capture, and/or package content that may be distributed to end-users (i.e. "subscribers"), via the service providers 120 and/or the distribution networks 110. In this regard, content may comprise audio, video, multimedia, e-book, gaming, and/or other content. Exemplary content providers may comprise commercial providers of multimedia content, such as major film or television production and/or distribution companies (e.g. Paramount Pictures or Warner Bros.), and/or providers of personal content (e.g. user-generated content). The content may be, for example, downloadable and/or streaming, rented and/or purchased. Content originating from the content providers 130 may be distributed to the end-users (e.g. consumers) by the service providers 120. In some instances, content providers 130 and service providers 120 may be separate entities. In some instances, however, a single provider may provide both content and services. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the broadband gateways 102 via one or more physical connections provided by a network access service provider.

The plurality of distribution networks 110 may comprise one or more networks that may be operable to enable wireless and/or wired communication among a plurality of local and/or remote entities, based on one or more networking and/or communication infrastructures. In this regard, the plurality of distribution network 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, Internet 110a, the Cable Television (CATV) network 110b, Satellite Television (TV) network 110c, wireless local network area/wide network area (LAN/WAN) 110d, and/or cellular network 110e.

The Internet 110a may comprise a system of interconnected networks to enable exchange of data among a plurality of nodes, based on one or more networking standards, including, for example, the Internet Protocol (IP). The Internet 110a may enable connectivity among a plurality of private and public, academic, business, and/or government nodes and/or networks. The physical connectivity in the Internet 110a may be provided via, for example, the Public Switched Telephone Network (PSTN), copper wires, fiber-optic cables, wireless interfaces, and/or other protocols and/or standards-based interfaces. The transport functionality in the Internet 110a may be performed based on, for example, one or more transport protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

Each of the home networks 100a-100n may correspond to a location that may comprise a plurality of devices, such as a plurality of home devices 104a-104j in the home network 100a, which may be serviced and/or managed by an instance of the broadband gateway 102. In this regard, the location may be a residence (e.g., home, apartment), a small business, a school, a library, and/or other like settings in which users may want to obtain access to service and/or to content provider networks. The broadband gateway 102 may be utilized in a home network, such as the home network 100a, to provide connectivity between the home network and one or more of the service providers 120 (and/or one or more of the content providers 130) via the distribution networks 110.

The broadband gateway 102 may comprise suitable logic, circuitry, interfaces, and/or code that may be operable to implement various aspects of the invention. In this regard, the broadband gateway 102 may be operable to communicate with the content providers 130, the service providers 120, and the plurality of home devices 104a-104j. In this manner, the broadband gateway 102 may enable bidirectional communication of content and/or other information between the content providers 130, the service providers 120 and the devices 104a-104j. Communications between the broadband gateway 102 and the content providers 130 and/or service providers 120 may be carried over optical, wired, and/or wireless links of the distribution network(s) 110. Similarly, Communications between the broadband gateway 102 and the devices 104a-104j may be carried over optical, wired, and/or wireless links. In an exemplary aspect of the invention, a single broadband gateway 102 may be operable to handle multiple physical layer (i.e., layer 1 of the open-systems interconnection model (OSI)) connections 108 to multiple ones, or portions, of the distribution network(s) 110, where different ones or portions of the distribution network(s) 110 may be owned, operated, leased, or otherwise associated with different ones of the network access service providers 120. For example, a first network access service provider may provide network access to the broadband gateway 102 via a DSL connection over twisted-pair cabling, and a second network access service provider may provide network access to the broadband gateway 102 via a cable television connection over coaxial cabling. In some instances, the broadband gateway 102 may be operable to concurrently communicate over the multiple physical layer connections provided by the multiple network access service providers.

The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers 130, wherein the content may be delivered through one or more services providers 120. For example, the broadband gateway 102 may be operable to perform such operations as network access related processing (e.g. PHY/MAC, and/or transport layer processing), encryption and/or decryption, user and/or account authentication, and/or at least some of video and/or audio processing operations which may be necessary for consumption of multimedia content.

The broadband gateway 102 may communicate with various devices in the home networks using optical, wired and/or wireless communication links. Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with the plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, an appliance 104h (e.g., refrigerator), a phone 104i, and a digital video recorder (DVR) or personal video recorder (PVR) 104j. The broadband gateway 102 may interact with each of the home devices 104a-104j via corresponding links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a wired or wireless link. The link 106i may comprise, for example, a phone line. The link 106j may comprise, for example, a wired or a wireless link. Although in the embodiment illustrated in FIG. 1A the home devices 104a-104j are shown as being communicatively coupled to only the broadband gateway 102, the invention may not be so limited. Accordingly, the devices 104a-104j may be communicatively coupled to multiple broadband gateways in a local or home network, and/or may be communicate directly, without departing from the spirit and scope of various embodiments of the invention.

The broadband gateway 102 may also be operable to provide and/or support various other, non-content related services in the home network 100a. For example, the broadband gateway 102 may provide emergency-related services in the home network 100a. For example, the emergency services provider network 140 may be connected to the distribution networks 110 via a link 112. The emergency services provider network 140 may be associated with one or more emergency service provider entities. For example, a public entity such as a 911 center and/or a private entity such as a security company may be able to interact with the broadband gateway 102 in the home network 100a via the distribution networks 110.

The broadband gateway 102 may also be operable to provide energy related services in the home network 100a. In this regard, the energy related services provided by the broadband gateway may enable optimizing energy use and/or reducing overall energy consumption in the home network 100a, or by serviced devices therein, and/or may enable capturing, claiming, and/or redeeming energy saving and/or efficiency credits/rewards that may be available. For example, the broadband gateway 102 may be operable to provide energy management services within the home network 100a. In this regard, as described hereafter in more details, the energy management service may comprise controlling and/or configuring one or more devices in the home network 100a, and/or operations thereof, to enable reducing energy consumption for example.

While the broadband gateway 102 is shown in FIG. 1A as a single and separate device, the invention need not be so limited. In one embodiment of the invention, the broadband gateway functionality may be implemented in a distributed manner over two or more devices. Furthermore, the broadband gateway may be implemented as a virtual platform, for example in instances where it may be implemented in distributed manner. In another embodiment of the invention, some or all of the functionality of the broadband gateway may be implemented within one of the televisions available in the home.

As illustrated in FIG. 1A, a plurality of home networks 100b, ..., 100n, may also be connected to the distribution networks 110. These home networks 100b, ..., 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, the broadband gateway 102 may be utilized as an interface device that may allow one or more service providers 120, content providers 130, and/or emergency service provider networks 140 to interact with various devices in a home network, such as in the home network 100a. In this regard, the broadband gateway 102 may support configuring and/or using the plurality of broadband connections 108. The broadband connections 108 may comprise optical, wired and/or wireless connections between the broadband gateway 102 and the distribution networks 110, to enable communication between the broadband gateway 102 and the service providers 120, content providers 130, and/or emergency service provider networks 140 for example. The broadband gateway 102 may be operable to perform and/or provide various services that may pertain to enabling and/or facilitating reception of data, such as multimedia content, for example, from one or more content providers, wherein the content may be delivered through one or more services providers. The broadband gateway 102 may distribute the received content to one or more devices in a home network, for consumption, and/or may perform, directly and/or indirectly using other devices, any processing and/or operations (e.g., decryption and/or account validation) that may be needed to ensure that the content may be consumed by the target home device(s).

The broadband gateway 102 may also provide and/or support various other services in the home network 100a beyond, and/or in conjunction with supporting or facilitating reception, download, and/or consumption of content. For example, the broadband gateway 102 may provide energy related services in the home network 100a. In this regard, the energy related services provided by the broadband gateway may enable optimization of energy consumption and/or reducing overall energy consumption in the home network 100a, and/or may enable capturing, claiming, and/or redeeming energy saving and/or efficiency credits/rewards that may be available. The broadband gateway 102 may be operable to provide, for example, energy management service within the home network 100a. In this regard, the energy management service provided by the broadband gateway 102 may comprise configuring, managing, and/or controlling one or more of the plurality of home devices 104a-104j, and/or operations performed thereby, to enable reducing and/or optimizing energy consumption. The power management service may also comprise managing, configuring and/or adjusting interactions between the broadband gateway 102 and the home devices 104a-104j, and/or among the home devices 104a-104j, to enable reducing and/or optimizing energy consumption. In this regard, optimal paths and/or optimal communication configuration may be selected based on energy consumption parameters and/or criteria for example, as shown in more details in FIG. 1B.

For example, at least some of the home devices 104a-104j may be configured and/or utilized in a plurality of ways, with corresponding different energy needs, limitations, configuration parameters, and/or energy-related device usage data, which may comprise use pattern and/or temporal related information. Some devices, such as the refrigerator 104h for example, may operate at different modes and/or settings. For example, with respect to the refrigerator 104h, the different settings may correspond to different temperature ranges at which the refrigerator 104h may maintain items stored within it. Operating at each of these temperature ranges may translate to different energy consumption profile. Some devices, such as the laptop computer 104b or the server 104d, may be operable to operate in and/or transition to different states, which may comprise low-power or power-saving states. In this regard, exemplary low-power and/or power-saving states may comprise disabling, shutting down, and/or reducing power consumption of the devices, and/or components and/or resources thereof, transitioning to these states. Accordingly, the broadband gateway 102 may be operable to determine when and/or if devices within the home network 100a, can be configured, setup and/or transitioned to operate in power-saving mode, setting, and/or state. The broadband gateway 102 may then communicate commands to corresponding home device to effectuate any such configuration, setup, and/or transition.

The power management service may also comprise managing, configuring and/or adjusting interactions between the broadband gateway 102 and the home devices 104a-104j, and/or among the home devices 104a-104j, which may enable reducing and/or optimizing energy consumption in the home network 100a. In this regard, certain characteristics and/or parameters of communications within the home network 100a may have energy efficiency implications, and may be adaptively configured and/or adjusted by the broadband gateway 102 accordingly to reduce and/or optimize energy consumption. Exemplary characteristics and/or parameters that may have energy efficiency implications may comprise transmission bitrates, type of physical layer (PHY) used, mode of operation and/or transmission, and/or communication paths or routes. For example, the broadband gateway 102 may determine, with regard to each link utilized in communicating data within the home network 102, whether each of both devices utilizing a particular link have the capability to reconfigure the physical (PHY) layer speed and/or scheduling of packet transmission, which may enable realizing energy saving by taking advantage of these capabilities. Discovery of capability may be performed as PHY layer based discovery, such as with extended page auto-negotiation; layer 2 (L2) based discovery, such as by utilizing Link Layer Discovery Protocol (LLDP) messages; and/or layer 3 (L3) based discovery. Accordingly, based on discovered capabilities, the broadband gateway 102 may adjust, modify, and/or reconfigure PHY layer(s), transmission scheduling, and/or network stack based buffering corresponding to each link. Accordingly, managing, configuring and/or adjusting inter-device interactions may comprise performing bitrate selection, PHY layer selection, and/or mode selection. For example, a serviced home device, such as the server 104d, may support links that enable communication at high bitrates and/or with certain features (e.g. full-duplex), such as 10 GBASE-T links for example. Handling such links, however, may necessitate extensive processing and/or buffering, which may translate to higher power consumption. Accordingly, in instances where the broadband gateway 102 may determine bitrates and/or features actually required, based on limitations within the home network 100a and/or external to it for example, the broadband gateway 102 may communicate with the corresponding devices to enable configuring links to support only anticipated required bitrates and/or to turn off some features deemed unnecessary, such that energy consumption may be reduced.

The broadband gateway 102 may also configure operations of links utilized by serviced devices to enable incorporating use of modes of operation that may be more energy efficient. For example, the broadband gateway 102 may detect whether serviced devices support use of such modes as sleep mode and/or burst-and-batch mode, and may configure the serviced device to incorporate use of any such mode during data communication to and/or from the serviced devices to enable reducing energy consumption during data communication, as shown in more details in FIG. 1C. In this regard, in sleep modes, the links may become inactive, thus saving energy. Incorporating and/or scheduling transitions to sleep states on links may be based on awareness by broadband gateway 102 of, for example, operations in the devices utilizing the link, and the application(s) running therein and/or utilizing the links. Incorporating and/or scheduling use of burst-and-batch on links may be based on awareness by broadband gateway 102 of resources and/or capabilities of the devices utilizing the links, and the application(s) running therein and/or utilizing the links.

The broadband gateway 102 may also adaptively manage, control, and/or configure delivery of data (e.g. content) to and/or between home devices 104a-104j. For example, the broadband gateway 102 may adaptively and/or dynamically select the type of PHY layers utilized for data communication, based on one or more requirements of the communication, such as latency requirement for example, to enable reducing energy consumption during the data communication. In this regard, selection of PHY layers may have energy implications since each PHY layer may require different amount of energy for transmitting the same amount of data.

For example, wired based PHY layers generally require less power than wireless based PHY layers. Also, within each category, such as within wired or wireless category, different types of connections may require different energy consumption. For example, within wired based connections, fibre based PHY layer typically require less power than copper based PHY layers. Similarly, cellular based PHY layers generally require less power than WiFi based PHY layers.

The broadband gateway 102 may also provide energy-aware routing management, such that the communicate data would be delivered using the energy saving connections. In this regard, the broadband gateway 102 may evaluate and/or determine energy costs associated with each of one or more routes that may be established and/or utilized to communicate data between the broadband gateway 102 and managed devices and/or to communicate data between the managed devices. The broadband gateway 102 may then select the route that provide the most efficient energy use. For example, because wired connections typically require less power than wireless connections, the broadband gateway 102 may determine that communicating data between two managed device using a first route that comprises wired connections traversing one or more intermediary devices (not involved in the actual communication) may be more energy efficient than a second route that comprises a direct wireless connection between the two devices exchanging the data.

In one embodiment of the invention, the broadband gateway 102 may create and/or maintain a energy related database which may be utilized in conjunction with energy management services provided within the home network 100a. In this regard, the energy related database may be utilized to store energy related information corresponding to devices serviced by the broadband gateway 102, and/or to operations performed thereby. For example, the energy related database may comprise device profiles, each of which corresponding to a device in the home network 100a, which may be populated with energy related information. Accordingly, the energy related information may be utilized to enable configuring the serviced devices, and/or configuring various aspects of the operations of the serviced devices, such as configuring interactions between the broadband gateway 102 and the serviced devices and/or interactions between the serviced devices.

Furthermore, users of the broadband gateway 102, within the home network 100a, may be able to interact with the broadband gateway 102, via a user interface for example, to view and/or configure the energy related database, or certain parts thereof such as the device profile, to adjust and/or modify energy management services provided by the broadband gateway 102.

The broadband gateway 102 may continually monitor and/or track operations of home devices 104a-104j, to determine and/or update energy related information corresponding thereto that may be utilized in conjunction with energy management services provided by the broadband gateway 102. In this regard, broadband gateway 102 may create and/or update corresponding device profiles in the energy related database. The broadband gateway 102 may utilize the monitoring and/or tracking of the home devices 104a-104j to tally up actual power consumptions, for individual devices and/or for the home network 100a as a whole, and/or may maintain corresponding data. The generated and/or maintained actual use data may be made available, and/or may be reported within the home network 100a, such as by a user of the broadband gateway 102, and/or external to the home network 100a, such as to energy providers.

In one exemplary embodiment of the invention, a dedicated protocol and/or interface may be utilized during energy related communications between the broadband gateway 102 and the home devices 104a-104j. In this regard, the energy protocol may define specific messages for requesting and/or reporting energy related information, and/or may define specific command to trigger energy related operations, such as during device or link configuration.

Figure 1B:
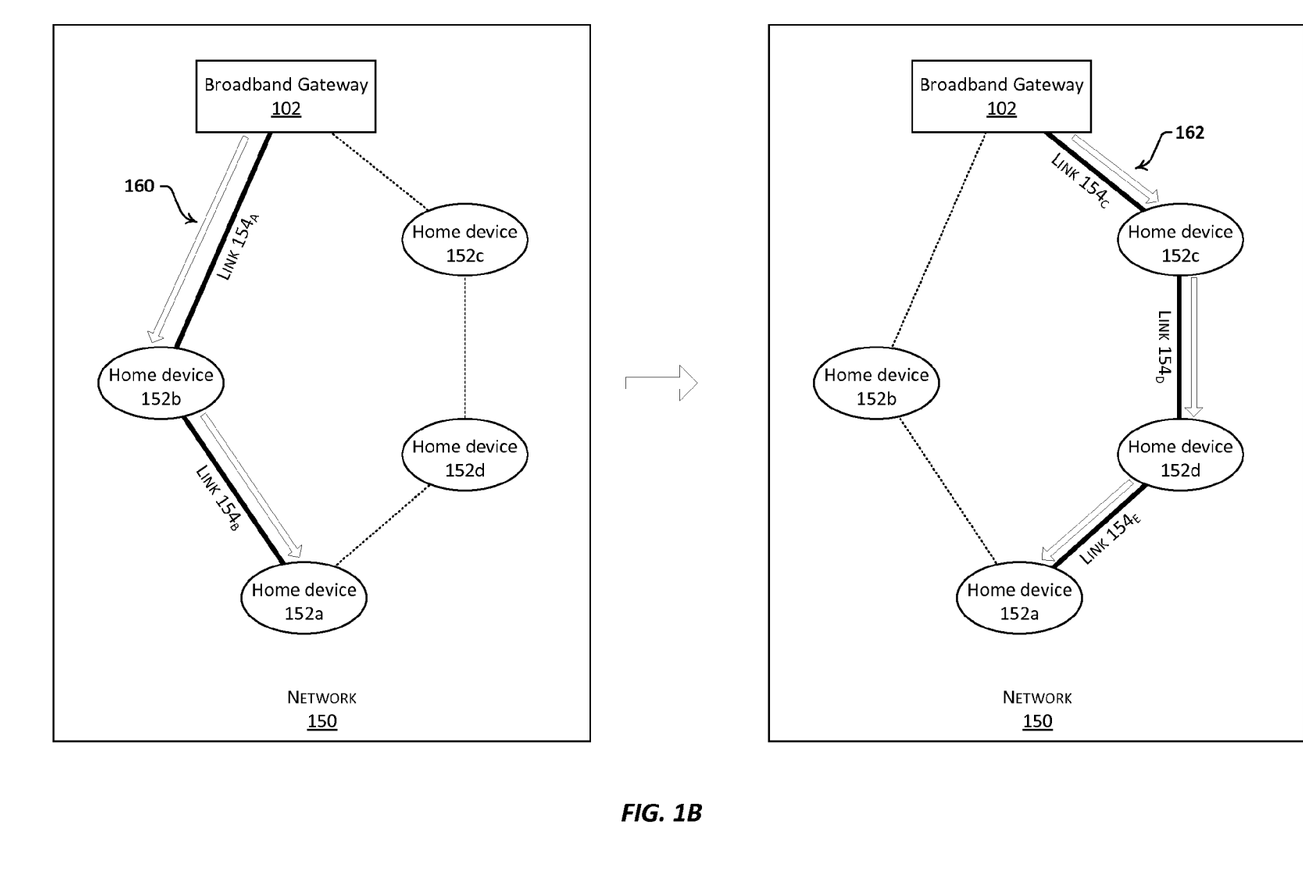
FIG. 1B is a block diagram illustrating reconfiguration of connectivity between a broadband gateway and a home device based on energy consumption, in accordance with an embodiment of the invention.

FIG. 1B is a block diagram illustrating reconfiguration of connectivity between a broadband gateway and a home device based on energy consumption, in accordance with an embodiment of the invention. Referring to FIG. 1B, there is shown the broadband gateway 102, which may be utilized to service and/or manage a network 150. In this regard, the network 150 may correspond to a home network, such as the home network 100a, or a portion such as comprising home devices 152a, 152b, 152c, and 152d.

The home devices 152a, 152b, 152c, and 152d may be similar to the home device 104a-104j, and may be managed by the broadband gateway 102, substantially as described with regard to FIG. 1A. In an exemplary aspect of the invention, the home device 152a may be selected for consuming content delivered via the broadband gateway 102, In this regard, the content may be delivered via one or more other home devices, such as the home devices 152b, 152c, and/or 150d.

In one exemplary embodiment of the invention, the broadband gateway 102 may be utilized for managing, configuring and/or adjusting communications between the broadband gateway 102 and home devices, or among the home device, to enable reducing and/or optimizing energy consumption. In this regard, the broadband gateway may configure and/or modify various communication related parameters and/or criteria within the network 150, to reduce and/or optimize energy consumption therein. These operations may be performed by the broadband gateway 102 adaptively and/or dynamically, and may comprise selection or configuration of transmission bitrates, compression rates or modes, type of physical layer (PHY) used, mode of operation and/or transmission, and/or communication paths or routes. For example, in instances where the broadband gateway 102 is requested to deliver a particular content to the home device 152a within the network 150, the broadband gateway may initially select and/or configure route 160, which may comprise utilizing links $152_A$ and $154_B$. In this regard, the broadband gateway 102 may configure and/or modify operations of the route 160, which may utilize home device 152b as routing intermediary for delivery the requested content to the home device 152a, by configuring and/or modifying one or more of the links $152_A$ and $154_B$ for example, to enable optimization energy consumption. This may comprise selecting the most energy efficient physical (PHY) layer, transmission bitrate, mode of operation and/or transmission, and/or data (content) compression rates or modes, in instances where various alternatives thereof may be available, while still ensuring satisfactory delivery of content, based on quality of service criteria for example. The broadband gateway 102 may continue to monitor and/or track operations of the home devices in the network 150, to enable enhancing energy consumption optimization where possible. For example, the broadband gateway 102 may determine that transitioning to route 162, which may utilize home devices 152c and 152d as routing intermediaries, may provide more energy efficient delivery of content within the network 150. This may be based on determination that the combined energy cost of utilizing links $154_C$, $154_B$, and $154_E$ may be less than the combined energy cost of utilizing links $154_A$ and $154_B$ for performing the same delivery of requested content. The transition from route 160 to 162 may require only changing the hopping nodes. Alternatively, enhancing energy optimization may require additional modification and/or configuration, such as modifying the requested content to lower compression rate, which may be available when using the route 162 for example.

In one exemplary embodiment of the invention, the broadband gateway 102 may determine capabilities corresponding to one or more of the links $154_A$-$154_E$, and/or may determine whether the two devices utilizing each of these links (e.g. home devices 152c and 152d with respect to link $154_D$) both have the capability to reconfigure the physical (PHY) layer speed and/or scheduling of packet transmission, to realize, for example, additional energy saving by taking advantage of these capabilities. In this regard, discovery of capability may be performed as PHY layer based discovery, such as with extended page auto-negotiation; layer 2 (L2) based discovery, such as by utilizing Link Layer Discovery Protocol (LLDP) messages; and/or layer 3 (L3) based discovery. Accordingly, based on discovered capabilities, the broadband gateway 102 may adjust, modify, and/or reconfigure PHY layer(s), transmission scheduling, and/or network stack based buffering corresponding to each link.

Figure 1C:
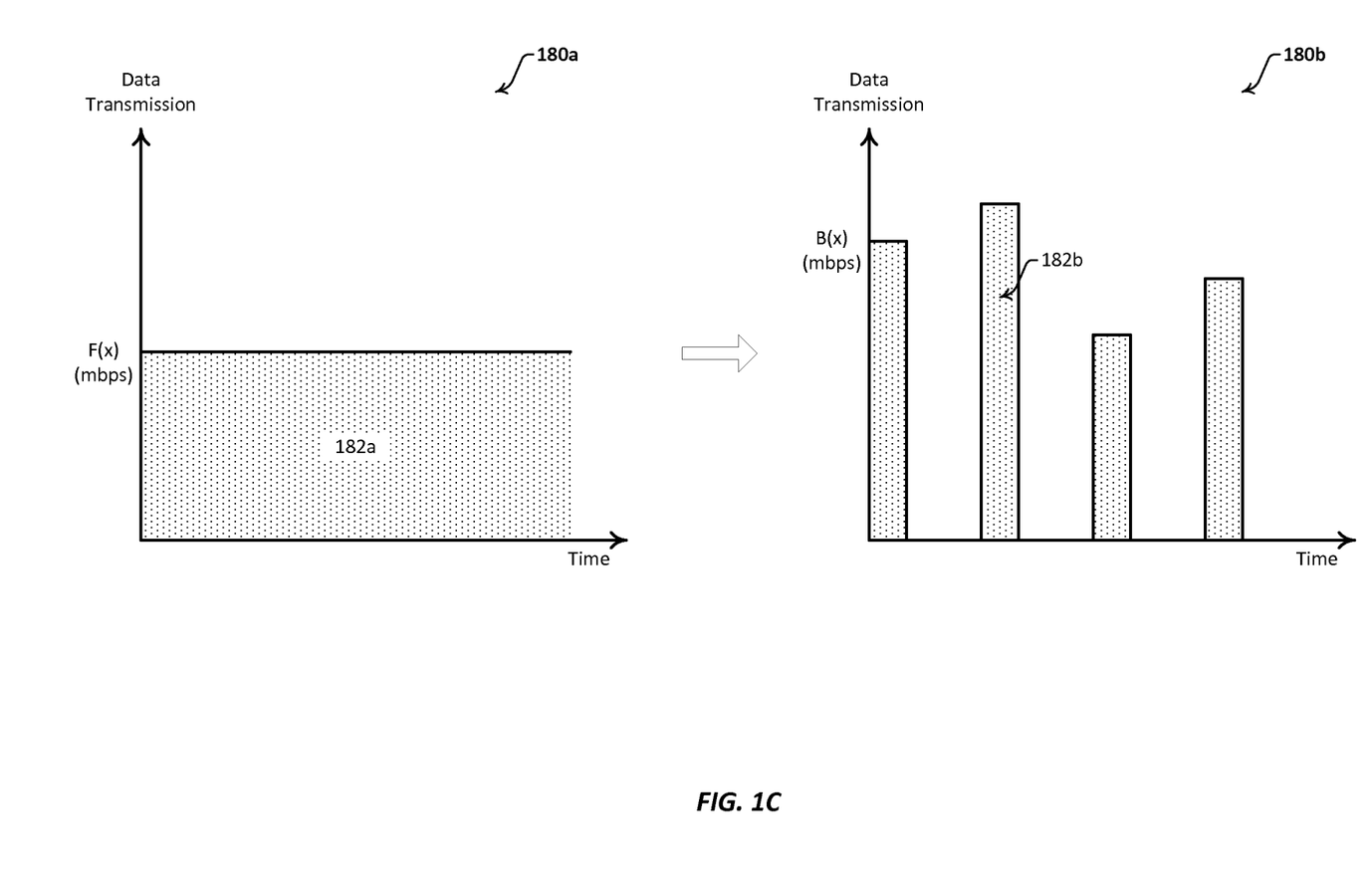
FIG. 1C is a diagram illustrating energy consumption that may result from utilizing burst mode during transmission within a home network, in accordance with an embodiment of the invention.

FIG. 1C is a diagram illustrating energy consumption that may result from utilizing burst mode during transmission within a home network, in accordance with an embodiment of the invention. Referring to FIG. 1C, there is shown 2-dimensional plans 180a and 180b, each comprising two axis. In this regard, the vertical axis may correspond to transmission bitrate.

The plans 180a and 180b may demonstrate energy consumption optimization that may result from configuring links utilized in a network managed or serviced by a broadband gateway, such as the broadband gateway 102, to incorporate energy efficient based modes. For example, the broadband gateway 102 may detect whether one or more of the home devices 152a-152d may support use of burst-and-sleep transmissions during communications via one or more of the links $154_A$-$154_E$. Accordingly, the broadband gateway 102 may configure the home device(s) to incorporate use of any such mode during communications via one or more of the links $154_A$-$154_E$. For example, the plane 180a may demonstrate energy consumption resulting from utilizing continuation transmissions, at a fixed rate, such as F(x). In this regard, energy consumption associated with data transmission and/or reception related operations may be represented, for example, with the shaded area 182a. The plane 180b may demonstrate energy consumption resulting from utilizing burst-type transmission at variable rates. In this regard, energy consumption associated with data transmission and/or reception related operations may be represented, for example, with the shaded areas 182b. Accordingly, while transmissions may be performed at higher rates during burst-and-sleep based operations, overall energy consumption may actually be reduced as a result of incorporating sleep periods in between the bursts, during which no transmission and/or reception related operations are performed.

Figure 2:
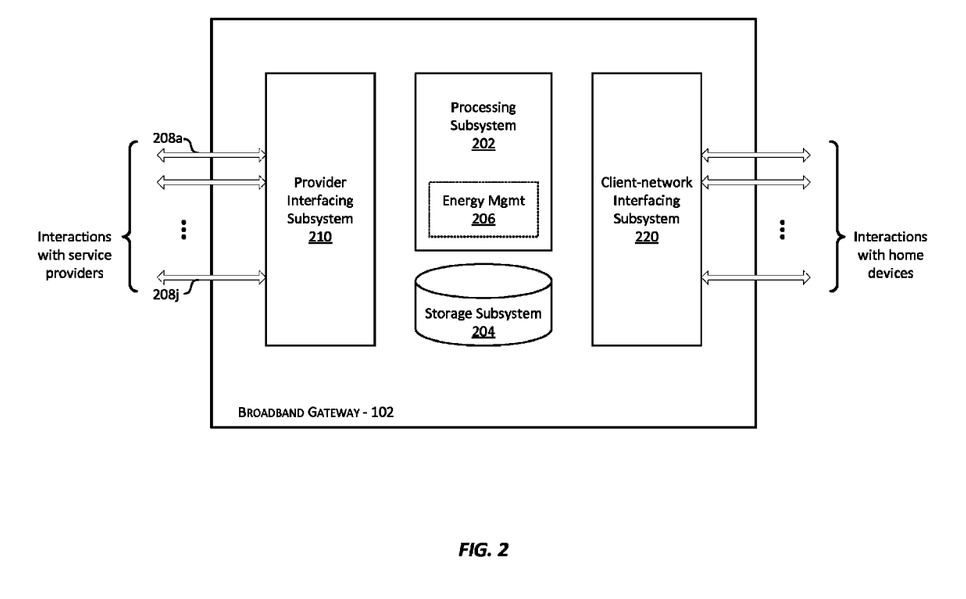
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, there is shown a broadband gateway 102 that may be substantially similar to the broadband gateway 102 described above with respect to FIG. 1A.

The broadband gateway 102 may comprise suitable logic, circuitry, code, and/or interfaces that may be operable to provide connectivity between one or more external networks, such as the distribution networks 110 shown in FIG. 1A, for example, and one or more devices in a home network, such as the home devices 104a-104j in the home network 100a shown in FIG. 1A. In this regard, the broadband gateway 102 may operate as an interface device that allows one or more service providers 120, content providers 130, and/or emergency service providers 140, to interact with various devices in a home network serviced by the broadband gateway 102, and/or among the home devices themselves within the serviced home network.

The broadband gateway 102 may interact with serviced devices in a home network, such as the home network 100a, via wired and/or wireless communication links, to support communicating between the broadband gateway 102 and the home devices, and/or among the home devices via the broadband gateway 102. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise a plurality of modules, each of which may comprise hardware, software, or a combination thereof that may be utilized to perform various operations associated with the broadband gateway 102. For example, in an embodiment of the invention, shown in FIG. 2, the broadband gateway 102 may comprise a processing subsystem 202, a storage subsystem 204, a provider interfacing subsystem 210, and a client-network interfacing subsystem 220. In some instances, the broadband gateway 102 may be such that the various modules listed above may be distributed over multiple devices. Moreover, the modules listed above are provided by way of illustration and not of limitation. Other configurations and/or architectures of the broadband gateway 102 may be implemented. For example, the broadband gateway 102 may be a virtual gateway setup in a network by utilizing virtual machines (VMs) and/or next-generation (NG) data centers.

The processing subsystem 202 may comprise suitable logic, circuitry, interfaces, and/or code that may be operable to process data received from the service and/or content providers and/or data received from one or more devices in the home network 100a. In this regard, the processing subsystem 202 may comprise one or more portions that are suitable to handle certain types of data such as video data and/or audio data, for example. The processing subsystem 202 may also be operable to control and/or manage operations of the broadband gateway 102, and/or performing tasks and/or applications therein. For example, the processing subsystem 202 may enable execution of applications, programs and/or code, which may be stored in the storage subsystem 204 for example. In this regard, the processing subsystem 202 may be operable to configure and/or control operations of various components and/or subsystems of the broadband gateway 102, and/or other devices managed by and/or connected to broadband gateway 102, by utilizing, for example, one or more control signals. The processing subsystem 202 may also control data transfers within the broadband gateway 102, in the course of performing various applications and/or tasks for example. The processing subsystem 202 may comprise, for example, a plurality of processors, which may be general and/or specialized processors (e.g. CPU, video processors, and/or audio processors). While the processing subsystem 202 is shown herein as a single block, the invention needs not be so limited. Accordingly, in instances where the broadband gateway 102 is implemented a distributed platform, some of the operations and/or functions described herein with regard to the processing subsystem 202 may be performed by different components that may be located in different devices. In an exemplary aspect of the invention, the processing subsystem 202 may comprise an energy management block 206. In this regard, the energy management block 206 may comprise suitable logic, circuitry, interfaces, and/or code that may be operable to perform, control, and/or manage energy related services provided by the broadband gateway 102, substantially as described with regard to FIG. 1A.

The storage subsystem 204 may comprise suitable logic, circuitry, interfaces, and/or code that may be operable to store data utilized in the operations of the broadband gateway 102. In this regard, the storage subsystem 204 may comprise one or more memory devices that may enable permanent and/or non-permanent storage, buffering, and/or fetching of data, code and/or other information which may be used, consumed, and/or handled in the broadband gateway 102. For example, the storage subsystem 204 may be utilized to store configuration data, parameters, device information, tracking and/or monitoring information, security information, and intermediate processing data, for example. The storage subsystem 204 may comprise storage media integrated in the broadband gateway 102 and/or one or more removable storage devices. The storage subsystem 204 may comprise different memory technologies, including, for example, read-only memory (ROM), random access memory (RAM), and/or Flash memory. In an exemplary aspect of the invention, the storage subsystem 204 may be utilized to store energy-related data and/or code, which may be utilized in conjunction with energy related services provided by the broadband gateway 102, substantially as described with regard to FIG. 1A.

The provider interfacing subsystem 210 may comprise suitable logic, circuitry, interfaces, and/or code that may be operable to communicate data via one or more physical layer connections 208a-208j, to one or more corresponding network access service providers via the distribution networks 110 for example. The provider interfacing subsystem 210 may be operable to support multiple communication protocols, standards, and/or data transport technologies. In this regard, each of the physical layer connections 208a-208j may connect the gateway 102 to different network access service provider, and may comprise a wired, optical, or wireless connection. Each of the physical layer connections 208a-208j may utilize different physical media and/or different physical layer protocols. For example, the connection 208a may comprise a DSL over twisted-pair connection whereas and the connection 208j may comprise a CATV over coaxial cable connection. Accordingly, the provider interfacing subsystem 210 may enable accessing and/or communicating with one or more service providers 120 and/or content providers 120, via the distribution networks 110. The provider interfacing subsystem 210 may also be utilized to communicate data to and/or from third parties. In this regard, the provider interfacing subsystem 210 may enable gateway-to-gateway communication and/or interactions between the broadband gateway 102 and communication devices located outside the home network 100a, directly and/or indirectly through distribution networks corresponding to one or more service providers. The provider interfacing subsystem 210 may enable concurrently communicating with multiple and/or different service/content providers and/or devices.

The client-network interfacing subsystem 220 may comprise suitable logic, circuitry, interfaces, and/or code that may be operable to send data to one or more devices in the home network serviced and/or managed by the broadband gateway, such as the home network 100a. The client-network interfacing subsystem 220 may also be operable to receive data from one or more devices in the home network 100a. The client-network interfacing subsystem 220 may be operable to support multiple communication protocols, standards, and/or data transport technologies. For example, the client-network interfacing subsystem 220 may support the links 106a-106j.

In operation, the broadband gateway 102 may be utilized as an interface device that may interact with a plurality of devices in a home network, such as such as the devices 104a-104j in the home network 100a, and/or may provide connectivity between the devices in the home network and service and/or content providers. The broadband gateway 102 may also interact with a plurality of home devices in a home network, such as the devices 104a-104j in the home network 100a, using the client-network interfacing subsystem 220. In this regard, the client-network interfacing subsystem 220 may support use of one or more of the links 106a-106j. Furthermore, the broadband gateway 102 may interact with one or more service providers 120 via the provider interfacing subsystem 210, to enable exchanging messages and/or content for example, via one or more of the distribution networks 110. Accordingly, the broadband gateway 102 may enable and/or facilitate obtaining content (e.g. multimedia content) from one or more content providers 130, wherein the content may be delivered through one or more services providers 120. The broadband gateway 102 may distribute the received content to one or more of the plurality of home devices 104a-104j, for content consumption, and/or may perform, directly via the processing subsystem 202 and/or indirectly utilizing other devices communicatively coupled to the broadband gateway 102, any processing and/or procedures (e.g. decryption and/or account validation) that may be necessary to ensure that the content may be consumed by the home device(s).

The broadband gateway 102 may be operable to run or execute an agent to extract content, rating, copyright, language, privacy rules, and automatically add user generated content, for example. Such agent may be run or executed in connection with the processing subsystem 202 of the broadband gateway 102, for example. Furthermore, the broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The broadband gateway 102 may also provide various services and/or tasks beyond, in addition to, and/or in conjunction with content delivery to home devices. For example, the broadband gateway 102 may perform content search, transport discovery, ranking, and/or sorting. In this regard, some operations may be performed based on content quality, price, quality-of-service (QoS), and network protocols supported by the devices in the home network, such as service level agreements (SLAB), for example.

The broadband gateway 102 may provide user interface services in the home network. In this regard, the broadband gateway 102 may be operable to support user interfaces, and/or to generate and/or store data corresponding thereto, which may be utilized to enable interactions between the broadband gateway 102 and users, such as in the home network 100a for example. Exemplary user interfaces may comprise graphic user interfaces (GUIs), which may enable visually displaying and/or providing interaction with users, to provide visual interaction with customized content for example. Information inputted and/or outputted using the user interfaces may be stored in the broadband gateway 102, via the storage subsystem 204 for example. The user interfaces may enable configuring the broadband gateway 102, and/or any applications and/or services provided thereby, and/or may also be utilized to configure and/or adjust other devices in the home network 100a. GUIs, and like interfaces, may be displayed using one or more devices coupled to the broadband gateway 102. For example, interfaces generated and/or used by the broadband gateway 102 may be displayed using the television 104a.

The broadband gateway 102 may also be utilized to create, maintain, and/or update a plurality of profiles corresponding to users, devices, and/or services available in the home network 100a. Furthermore, user interfaces supported and/or used by the broadband gateway 102 may be utilized to enable displaying and/or modifying user, device, and/or service profiles. Data corresponding to these profiles may be stored in the storage subsystem 204 of the broadband gateway 102. For example, device-profiles may be utilized to store information associated with particular devices that may be coupled to and/or serviced by the broadband gateway 102. In this regard, device-profiles may be utilized for storage of information pertaining to device capabilities, limitations, requirements, and/or configuration parameters therefor. User-profiles may be utilize to store information associated with particular users, such as setting preferences for various devices and/or services that may be utilized by a particular user in conjunction with the broadband gateway 102. The broadband gateway 102 may utilize user and/or home device profile information to, for example, select layered video service(s) and/or transmission. In some instances, the programming and/or enhanced video layers received by the broadband gateway 102 may be aggregated midstream by one or more network or routing nodes.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

In various embodiments of the invention, the broadband gateway 102 may provide, via the energy management block 206 for example, energy related services in a network serviced by the broadband gateway 102, such as the home network 100a for example, substantially as described with regard to FIG. 1A. In this regard, the energy management block 206 may be utilized to provide energy management service within a network serviced by the broadband gateway 102. The energy management service may comprise configuring, managing, and/or controlling one or more devices therein, and/or operations performed thereby, to enable reducing and/or optimizing energy consumption. Data and/or code utilized in these operations may be stored in, and/or retrieved from the storage subsystem 204. Furthermore, the broadband gateway 102 may interact with the managed devices via the client-network interfacing subsystem 220 when providing the energy management service.

For example, the broadband gateway 102 may be operable to configure one or more devices in a serviced network, such as one or more the home devices 104a-104j within the home network 100a, based on such criteria as energy needs, limitations, and/or default or predetermined configuration parameters, substantially as described with regard to FIGS. 1A, 1B, and/or 1C. In this regard, the energy management block 206 may determine when and/or if the serviced devices can be configured, setup and/or transitioned to operate in power-saving mode, setting, and/or state. Furthermore, the energy management block 206 may communicate, via the client-network interfacing subsystem 220, commands to the devices to effectuate any such configuration, setup, and/or transition.

The power management service may also comprise managing, configuring and/or adjusting interactions between the broadband gateway 102 and the managed devices, and/or among the managed devices within the serviced network, substantially as described with regard to FIGS. 1A, 1B, and/or 1C. In this regard, the energy management block 206 may be utilized to evaluate and/monitor characteristics and/or parameters of communications that may have energy efficiency implications, such as transmission bitrates, type of PHY layer used, and/or mode of operation or transmission in used link. The broadband gateway 102 may adaptively select, configure, and/or adjust corresponding communications, or parameters thereof, to enable reducing and/or optimizing energy consumption within the serviced network.

The energy management block 206 may also be utilized to enable providing energy-aware routing management by the broadband gateway 102. In this regard, the energy management block 206 may evaluate and/or determine energy costs associated with each of one or more routes that may be established between the broadband gateway 102 and managed devices and/or among the managed devices to perform a required data communication. This may enable selecting the most energy efficient means of performing that data communication within the serviced network.

In an exemplary embodiment of the invention, the broadband gateway 102 may be operable to create and/or maintain an energy related database, which may be utilized in conjunction with energy management services provided by the broadband gateway 102. In this regard, the energy related database may be utilized to store energy related information corresponding to devices serviced by the broadband gateway 102, and/or to operations performed thereby, substantially as described with regard to, for example, FIGS. 1A, 1B, and/or 1C. The energy related database, or portions thereof, may be stored into, and/or retrieved from the storage subsystem 204 for example.

The broadband gateway 102 may continually monitor and/or track, via the energy management block 206 for example, operations of managed devices, to determine and/or update energy related information corresponding thereto which may be utilized in conjunction with energy management services provided by the broadband gateway 102. In this regard, the broadband gateway 102 may create and/or update corresponding device profiles in the energy related database. Furthermore, actual power consumption may be tracked and/or aggregated, to create actual usage data for each of the managed devices and/or for the serviced network as a whole. The actual usage data may be made available, and/or may be reported within the serviced network, and/or external to the serviced network, such as to energy providers, using the provider interfacing subsystem 210 for example.

In an exemplary embodiment of the invention, a dedicated protocol and/or interface may be utilized during energy related communications between the broadband gateway 102 and managed devices, substantially as described with regard to FIGS. 1A, 1B, and/or 1C. In this regard, the client-network interfacing subsystem 220 may be configured to support and/or incorporate any such energy protocol.

Figure 3A:
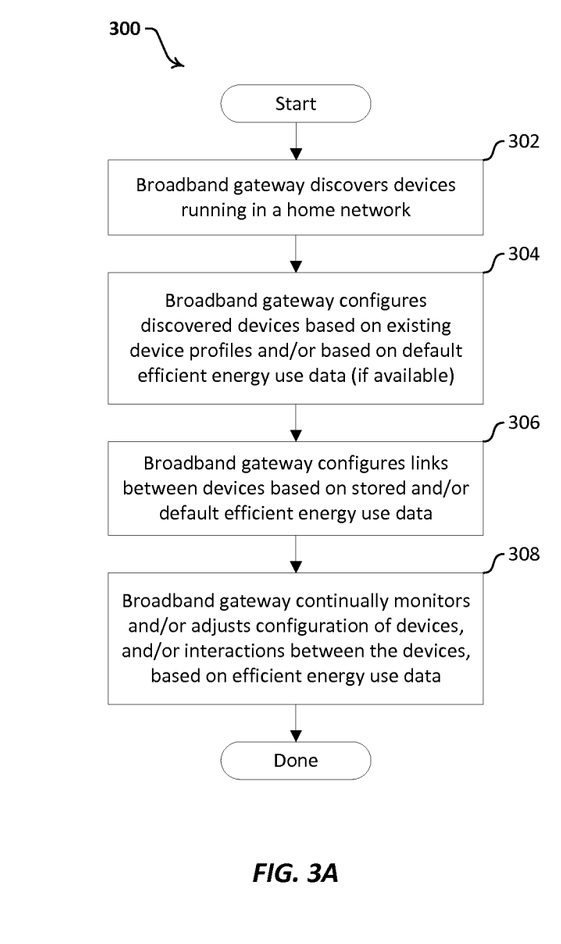
FIG. 3A is a flow chart that illustrates exemplary steps for utilizing the gateway to provide energy efficient management in a home network, in accordance with an embodiment of the invention.

FIG. 3A is a flow chart that illustrates exemplary steps for utilizing a gateway to provide energy efficient management in a home network, in accordance with an embodiment of the invention. Referring to FIG. 3A, there is shown a flow chart 300 comprising a plurality of exemplary steps that may be performed to enable utilizing the gateway to provide energy efficient management in a home network.

In step 302, existing devices in a network serviced by a broadband gateway may be discovered. For example, the broadband gateway 102 may determine which of the home devices 104a-104j in the home network 100a may be running. Furthermore, the broadband gateway 102 may also determine which of the discovered device may be configured and/or managed to enhance energy consumption efficiency within the home network 100a. In step 304, the discovered devices may be configured based on existing device profiles and/or based on default efficient energy use data (if available). For example, the broadband gateway 102 may configure the refrigerator 104h, the laptop 104b, and/or the server 104d, substantially as described with regard to FIGS. 1A, 1B, and/or 1C. In step 306, links between devices may be configured based on stored and/or default efficient energy use data. For example, the broadband gateway 102 may configure communications between the broadband gateway 102 and one or more managed devices of the plurality of the home devices 104a-104j, substantially as described with regard to FIGS. 1A, 1B, and/or 1C. In step 308, the broadband gateway may continually monitor and/or adjust configuration and/or setting of devices, and/or interactions between the devices based on efficient energy use data.

Figure 3B:
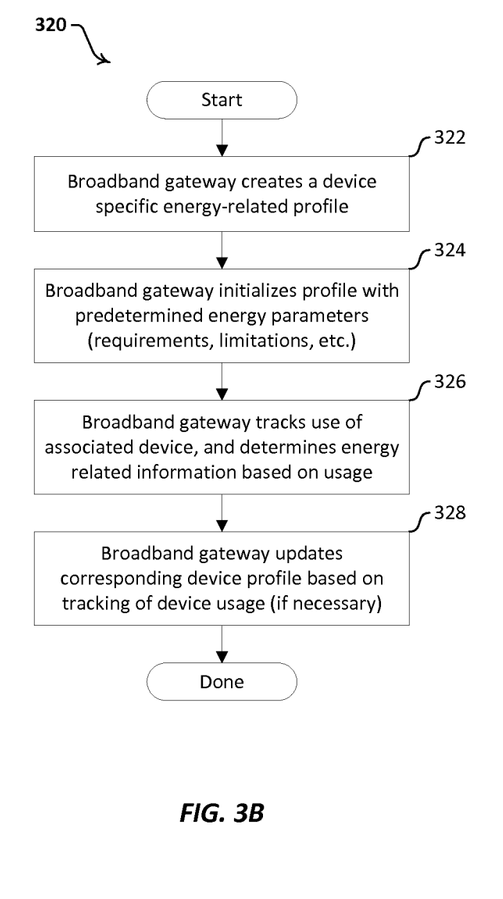
FIG. 3B is a flow chart that illustrates exemplary steps for utilizing the gateway to generate and/or update device profiles for use in conjunction with energy efficient management services in a home network, in accordance with an embodiment of the invention.

FIG. 3B is a flow chart that illustrates exemplary steps for utilizing a gateway to generate and/or update device profiles for use in conjunction with energy efficient management services in a home network, in accordance with an embodiment of the invention. Referring to FIG. 3B, there is shown a flow chart 320 comprising a plurality of exemplary steps that may be performed to enable generating and/or updating efficient energy related device profiles.

In step 322, a broadband gateway may create a device specific energy-related profile for a device serviced by the broadband gateway. For example, the broadband gateway 102 may create a device profile, as entry in the energy management database for example, for each discovered and/or managed device in a network serviced by the broadband gateway 102. The device profile may be utilized to store energy related parameters and/or information, such as energy requirements and/or limitations related data and/or energy related configuration information. In step 324, the broadband gateway may initialize device profile, with preconfigured, predetermined, and/or default energy parameters, such as energy requirements, energy limitations, energy related configuration information. In step 326, use of associated device may be tracked, and energy related information may be determined based on the tracked usage. In step 328, corresponding device profile may be updated and/or modified based on tracking of device usage (if necessary).

Figure 4:
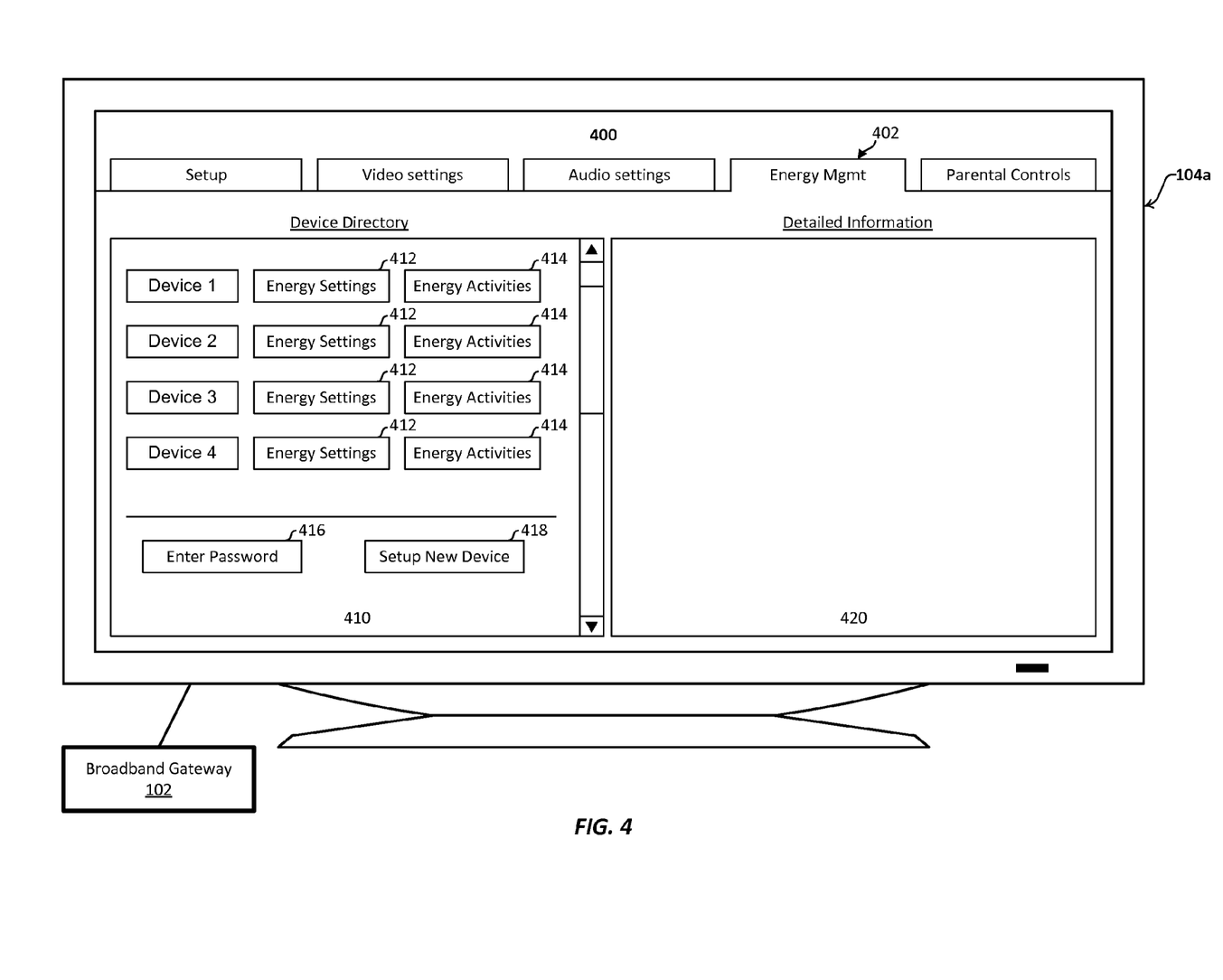
FIG. 4 is a block diagram illustrating an exemplary user interface generated by a broadband gateway for configuring energy efficient management in a home network, in accordance with an embodiment of the invention.

FIG. 4 is a block diagram illustrating an exemplary user interface generated by a broadband gateway for configuring energy efficient management in a home network, in accordance with an embodiment of the invention. Referring to FIG. 4, there is shown a user interface 400.

The user interface 400 may, for example, be displayed as part of an on-screen display (OSD) and/or may be accessible via a "menu" button. The user interface 400 may be generated directly by the broadband gateway 102, and/or by other devices based on data provided by the broadband gateway 102, to enable interactions between the broadband gateway 102 and users associated with the broadband gateway 102, in the home network 100a for example. The user interface 400 may be displayed using a display device connected to the broadband gateway 102, such as the television 104a for example. In this regard, the link 106a may be utilized to communicate data and/or messages between the broadband gateway 102 and the television 104a, to enable communicating data that may be displayed using the user interface 400, and/or receiving user input, selection, and/or feedback which may be provided based on interactions with the user interface 400.

The exemplary user interface 400 may be utilized to enable users to setup the broadband gateway 102, and/or to control, configure and/or modify various applications and/or tasks, or aspects thereof, which may provided by the broadband gateway 102. In an exemplary aspect of the invention, the user interface 400 may incorporate an energy management function 402, which may be utilized to setup, configure, and/or manage energy usage in a plurality of home devices serviced by the broadband gateway 102.

The energy management function 402 may comprise, for example, frames 410 and 420. The frame 410 may display a device directory which may be associated with energy management profile for managing energy in a plurality of home devices. The device directory may comprise a listing of available devices. Associated with each device entry may be two buttons 412 and 414. Upon selection or activation of button 412 by a user, by clicking on it for example, detailed information regarding energy settings for the corresponding device may be displayed in the frame 420. This may comprise energy requirements and/or limitations related data and/or energy related configuration information. Some of these parameters may be configurable by the user, using corresponding fields and/or buttons in the frame 420 for example. Other parameters may not be configurable, and may simply be populated based on information provided by the associated device. For example, in instances where a device profile correspond to the refrigerator 104h, the frame 420 may display energy requirements and/or limitations corresponding to each of available modes of operation.

Selection and/or activation of button 414, by clicking on it for example, may enable displaying energy activities for the corresponding device in the frame 420. In this regard, in instances where the broadband gateway 102 is utilized to track and/or tally actual energy consumption, substantially as described with regard to FIG. 1A, the information corresponding to each managed device may be displayed in the frame 420 upon selection and/or activation of the button 414 in the corresponding device entry. The information may be arranged in verity of ways, and/or the display setting may be configurable and/or adjustable by the user using appropriate buttons and/or fields in the frame 420. For example, the user may be able to specify whether to display the average and/or actual energy consumption rates, for example monthly, weekly, daily, and/or daily, for a specific device within a specific duration.

The frame 410 may also comprise a button 416 which may selected to enable entering one or more passwords before proceeding with any selection of buttons 412 or 414. In this regard, a user password may be required before displaying any of the details on frame 410. Accordingly, failure to provide the correct password may prevent displaying frame 420. The frame 410 may also comprise a button 418 which may be selected to enable setting up a new device entry. Device setup may be performed as a step-by-step procedure based on interactions using frame 420.

Various embodiments of the invention may comprise a method and system for utilizing a broadband gateway to provide energy efficient management in a home network. The broadband gateway 102 may be utilized to provide, via the energy management block 206 for example, energy management service within a home network, such as the home network 100a. The energy management service may enable reducing and/or optimizing energy consumption within the home network 100a. In this regard, the energy management service provided by the broadband gateway 102 may comprise managing one or more of the plurality of devices 104a-104j in the home network 100a, to enable reducing and/or optimizing energy consumption by the managed devices. The broadband gateway 102 may perform device management via the energy management block 206 for example, based on energy-related data that may be maintained by the broadband gateway 102, using the storage subsystem 204 for example. The energy-related information may be associated with each of the managed devices, and may be utilized to control the managed devices based on the maintained energy-related data for example. In this regard, at least some of the energy-related information may be acquired, from one or more of the managed devices for example. The energy-related information may comprise energy requirements, energy limitations, and/or energy related usage parameters. The energy management service may comprise controlling and/or configuring, via the energy management block 206 for example, managed devices and/or operations thereof. The energy management service may also comprise controlling and/or configuring communications and/or links within the home network 100a, among the managed devices and/or between broadband gateway 102 and at least one of the managed devices. The broadband gateway 102 may track and/or tally or aggregate, via the energy management block 206 for example, actual energy usage by each of managed devices, and the broadband gateway 102 may update and/or modify the stored energy-related information based on that tracking.

The stored information may comprise device profiles corresponding to each of managed devices. The device profile may comprise a plurality of settings for controlling and/or managing energy use in an associated device. The device profiles may be configurable, via the user interface 400 for example, wherein the profile configuration may comprise initializing and/or modifying one or more of a plurality of settings for controlling and/or managing energy use in an associated device. The broadband gateway 102 may display activity associated with the energy management service, via the user interface 400 for example. This may comprise display energy related activities and/or data associated with each of the managed devices. A dedicated energy-related messaging protocol may be used for exchanging energy-related messages and/or data within the home network.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing a broadband gateway to provide energy efficient management in a home network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a broadband gateway communicatively coupled to a plurality of devices, wherein said broadband gateway is operable to handle at least one physical layer connection to at least one corresponding network access service provider:
   providing an energy management service to said plurality of devices, wherein said provided energy management service comprises:
     storing in the broadband gateway energy-related information associated with one or more of said plurality of devices; and
     managing operation of network communications of said one or more of said plurality of devices based on said energy-related information, via adjustment of a setting corresponding to the network communications, wherein the setting comprises a bitrate selection, a PHY layer selection, and a transmission mode selected from the group consisting of: burst-and-sleep mode and burst-and-batch mode.

2. The method according to claim 1, comprising controlling or configuring said one or more of said plurality of devices during said management of said operation of network communications of said one or more of said plurality of devices.

3. The method according to claim 1, comprising controlling or configuring communications between at least some of said one or more of said plurality of devices during said management of said operation of network communications of said one or more of said plurality of devices.

4. The method according to claim 1, comprising tracking energy use in said one or more of said plurality of devices.

5. The method according to claim 4, comprising updating or modifying said stored energy-related information based on said tracking.

6. The method according to claim 1, wherein said stored energy-related information comprises a device profile corresponding to each of said one or more of said plurality of devices, said device profile comprising a plurality of settings for controlling or managing energy use in an associated device.

7. The method according to claim 6, wherein said device profile is configurable, said configuration comprising initializing or modifying one or more of a plurality of settings for controlling or managing energy use in an associated device.

8. The method according to claim 1, comprising displaying activity associated with said energy management service via a user interface.

9. The method according to claim 1, wherein said energy-related information comprises energy requirements, energy limitations, device use patterns, or temporal related use data.

10. The method according to claim 1, comprising communicating energy-related messages based on an energy-specific protocol during said energy management service.

11. A system comprising:
one or more circuits, one or more processors, or any combination thereof, for use in a broadband gateway communicatively coupled to a plurality of devices, wherein said broadband gateway is operable to handle at least one physical layer connection to at least one corresponding network access service provider, said one or more circuits, one or more processors, or any combination thereof being operable to provide an energy management service to said plurality of devices, said provided energy management service comprising:
determining that one or more of the plurality of devices may have energy consumption controlled or configured by the broadband gateway;
storing in the broadband gateway of energy-related information associated with network communications of the one or more of said plurality of devices; and
managing management of operation of network communications of said one or more of said plurality of devices based on said energy-related information via adjustment of a setting corresponding to the network communications, wherein the setting comprises a bitrate selection, a PHY layer selection, and a transmission mode selected from the group consisting of: burst-and-sleep mode and burst-and-batch mode.

12. The system according to claim 11, wherein said one or more circuits or processors are operable to control or configure said one or more of said plurality of devices during said management of said operation of network communications of said one or more of said plurality of devices.

13. The system according to claim 11, wherein said one or more circuits or processors are operable to control or configure communications between at least some of said one or more of said plurality of devices during said management of said operation of network communications of said one or more of said plurality of devices.

14. The system according to claim 11, wherein said one or more circuits or processors are operable to track energy use in said one or more of said plurality of devices.

15. The system according to claim 14, wherein said one or more circuits or processors are operable to update or modify said energy-related information based on said tracking.

16. The system according to claim 11, wherein said stored information comprises a device profile corresponding to each of said one or more of said plurality of devices, said device profile comprising a plurality of settings for controlling or managing energy use in an associated device.

17. The system according to claim 16, wherein said device profile is configurable, said configuration comprising initializing or modifying one or more of a plurality of settings for controlling or managing energy use in an associated device.

18. The system according to claim 11, wherein said one or more circuits or processors are operable to display activity associated with said energy management service via a user interface.

19. The system according to claim 11, wherein said energy-related information comprises energy requirements, energy limitations, device use patterns, and temporal related use data.

20. The system according to claim 11, wherein said one or more circuits or processors are operable to communicate energy-related messages based on an energy-specific protocol during said energy management service.

21. A system comprising:
a broadband gateway communicatively coupled to a plurality of computing devices, wherein said broadband gateway is operable to handle at least one physical layer connection to at least one corresponding network access service provider to provide an energy management service to said plurality of computing devices, said provided energy management service comprising:
monitoring of energy-related information associated with network communications of the plurality of computing devices;
storing the energy-related information associated with the plurality of computing devices; and
adjusting a setting associated with the network communications of at least one of the plurality of computing devices based at least upon the stored energy-related information, wherein the setting comprises a bitrate selection, a PHY layer selection, and a transmission mode selected from the group consisting of: burst-and-sleep mode and burst-and-batch mode.

* * * * *